United States Patent [19]

Kim

[11] Patent Number: 5,349,369

[45] Date of Patent: Sep. 20, 1994

[54] IMAGE INTERPOLATION CIRCUIT

[75] Inventor: Hak S. Kim, Seoul, Rep. of Korea

[73] Assignee: Samsung Electronics Co., Ltd., Kyungki-Do, Rep. of Korea

[21] Appl. No.: 95,469

[22] Filed: Jul. 23, 1993

[30] Foreign Application Priority Data

Jul. 23, 1992 [KR] Rep. of Korea .................... 92-13153

[51] Int. Cl.⁵ ............................................. G09G 5/00
[52] U.S. Cl. ..................................... 345/136; 345/138
[58] Field of Search .................. 345/136, 138; 382/47, 382/54; 395/128

[56] References Cited

U.S. PATENT DOCUMENTS 4,988,984  1/1991  Gonzalez-Lopez ................. 345/138

Primary Examiner—Richard Hjerpe
Assistant Examiner—Minsun Oh
Attorney, Agent, or Firm—Sughrue, Mion, Zinn, Macpeak & Seas

[57] ABSTRACT

An image interpolation circuit is able to connect linearly the discontinued space between two coordinate points input by an outside input unit of which transmission speed is slow. After comparing two coordinate points input by the outside input unit, if they are different, the absolute values ΔX and ΔY of two coordinate values are compared each other. And then, a bigger interpolation output is up or down by means of programmable up and down counter 12, 13. Such a up or down is repeated until a value totaling smaller absolute values is same as or bigger than a bigger absolute value, and then after reestablishing a beginning value, the processes are repeatedly executed. So that the linear interpolation value between two coordinate points can be obtained from a construction of hardware, and a processing speed is faster than a processing method using the prior software, thereby easily matching with other peripheral circuits because of the construction of the hardware.

4 Claims, 9 Drawing Sheets

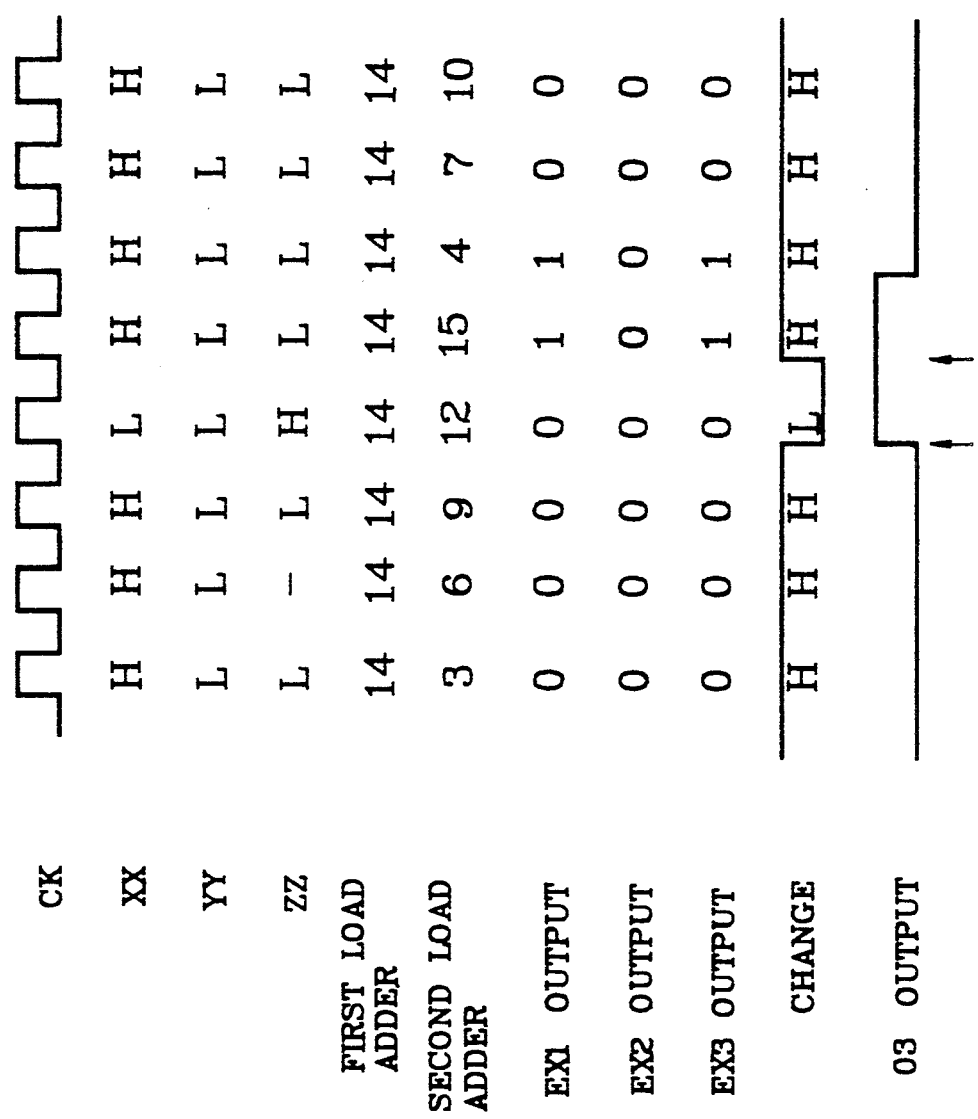

& # 1

IMAGE INTERPOLATION CIRCUIT

FIELD OF THE INVENTION

The present invention relates to an image interpolation circuit, and more particularly to an image interpolation circuit which can linearly contact a discontinued-/empty space between two coordinate points which are input by an external input unit having a slow transmission speed. The present disclosure is based on the disclosure of Korean Patent Application No. 92-13153 filed Jul. 23, 1992, which disclosure is incorporated herein by reference.

BACKGROUND OF THE INVENTION

A tablet board is an example of a general external input unit. The tablet board, which is a type of a graph readout unit, reads coordinate values of X, Y with a light pen on the board and inputs the coordinate values into a computer, thereby being used for reading characters.

The conventional tablet board has a limitation in its transmission speed since a modem is used when giving and taking data through the tablet board. For example, when transmitting data by using the modem at a speed of 9600 BPS (Bit Per Second), a coordinate point of 100 Point Per Second is input on the tablet board. However, when a user draws with the light pen on the tablet board, he can draw a locus of more than 100 Point Per Second, and at that time, since a connecting line of the locus is broken at different places, the user has to connect the spaces.

Furthermore, in order to connect the discontinued spaces between the connection lines of the drawn locus, after reading coordinate points of both ends of the discounted space, the two coordinate points are to be linearly connected. In this regard, since such a connection in the prior art is to be handled by software, there is a disadvantage in that a processing speed is slow due to the limitation of a clock frequency.

Meanwhile, U.S. Pat. No. 4,988,984 describes an image interpolator for an image display system, and FIG. 1 shows a block diagram thereof.

The conventional image interpolator according to FIG. 1 interpolates an image by expanding the number of input pixels by an expansion coefficient and making pixels more than the number of originally input pixels, in which its purpose is to prevent a picture quality and definition from being deteriorated by providing a real-time image interpolation function.

The image interpolator comprises an input register 1000 for storing an interpolated image, a switch 1100 connected to the input register 1000, a number of line buffers 1200, 1300, 1400 connected to the switch 1100, a coefficient generator 1500 for generating an interpolation coefficient, an address generator 1600 for generating an address according to a signal from the coefficient generator 1500, a selector 1700 for selecting the outputs of the line buffers 1200, 1300, 1400 according to a controlling signal of the coefficient generator, and a second dimensional filter 1800 connected to the selector 1700 and coefficient generator 1500, for outputting the interpolated image value based on answering to the coefficient generator 1500 and contents of line buffers 1200, 1300, 1400.

A method of generating an interpolation signal from the conventional image interpolator with the above-mentioned construction is to make an interpolation signal Q (i, m) by the original input pixels P(i, j) and P(i, J+1), an interpolation signal Q (i+1, m) by P(i+1, j) and P (i+1, J+1), and an interpolation signal V(n, m) by Q (i, m) and Q (i+1, m), as shown in FIG. 2, thereby outputting V(n, m) as an interpolation signal and interpolating an image.

However, the conventional image interpolator generates an interpolation signal only by taking continuously an average value of input pixels. That is, since it interpolates an image by making an image interpolation signal according to an interpolation coefficient, the interpolation signal depends on the interpolation coefficient. Furthermore, since it must have a circuit for generating an interpolation coefficient, it has a disadvantage that the circuit is complicated.

SUMMARY OF THE INVENTION

In order to solve the problems, an object of the present invention is to provide an image process unit that improves a data processing speed by hardware when linearly connecting two coordinate points input by an external input unit with a slow transmission speed in the conventional image processing unit.

An image interpolation circuit which accomplishes the above object according to the present invention is characterized by comprising: first through fourth latches for storing X abscissa and Y ordinate values of two coordinate points input by an outside input unit; first and second comparators connected to the first through fourth latches, respectively, for comparing sizes between input X1 and X2 abscissa points and between input Y1 and Y2 ordinate points; first and second subtracters connected to the first and second comparators, respectively, for obtaining absolute values of the differences between input X1 and X2 abscissa points and between input Y1 and Y2 ordinate points; first and second load adders connected to the first and second subtracters, respectively, for adding absolute values of the X1 and X2 abscissa points and of said Y1 and Y2 ordinate points to the loaded values, after loading absolute values of X1 and X2 abscissa points and of the Y1 and Y2 ordinate points obtained from the first and second subtracters; an absolute value comparator connected to the first and second load adders, for comparing outputs of the first and second load adders; first and second a programmable up and down counters connected to the second and fourth latches and the first and second comparators, respectively, for outputting an interpolation signal by up or down counting the first X axis abscissa value or Y axis ordinate value having a bigger absolute value as a result of the comparison of the absolute value comparator; first and second interpolation comparators connected to the first and second programmable up and down counters, for disabling the first and second programmable up and down counters by comparing outputs of the first and second programmable up and down counters with the second X axis input value and Y axis input value; a control signal generating portion connected to the absolute value comparator, for outputting count enable signals of the first and second programmable up and down counters by using the output of the absolute value comparator; a selection signal generating portion connected to the control signal generating portion, for controlling loads or adding of the first and second load adders by using an output signal of the control signal generating portion; and a clock generator connected to the control signal generating portion, for generating a clock to control an operation of the first and second load adders by assembling an output signal of the control signal generating portion with an outside or external clock signal.

BRIEF DESCRIPTION OF THE DRAWINGS

FIG. 8 is a detailed diagram illustrating a control signal generating portion of FIG. 3;

DETAILED DESCRIPTION OF THE PREFERRED EMBODIMENT

A preferred embodiment of an image interpolation circuit according to the present invention will be in detail described with reference to the accompanying drawings.

Figure 1:
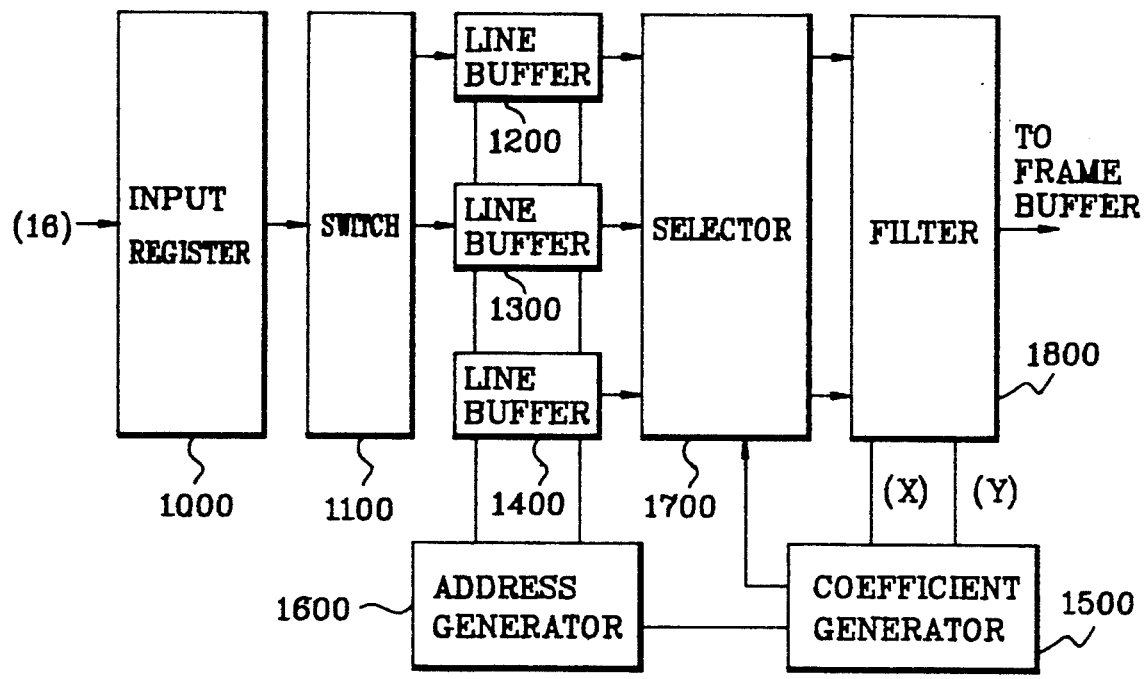
FIG. 1 is a block diagram illustrating a conventional image interpolation circuit.
Figure 2:
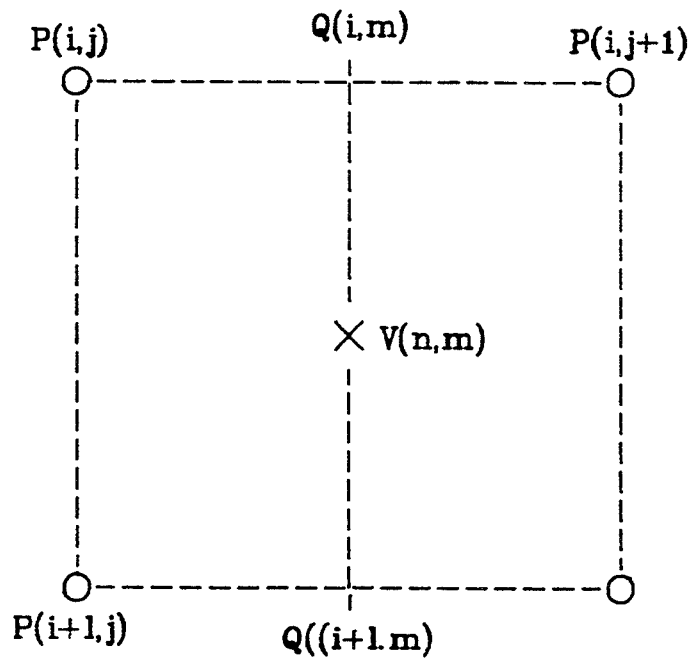
FIG. 2 shows an interpolation signal generation according to FIG. 1.
Figure 3:
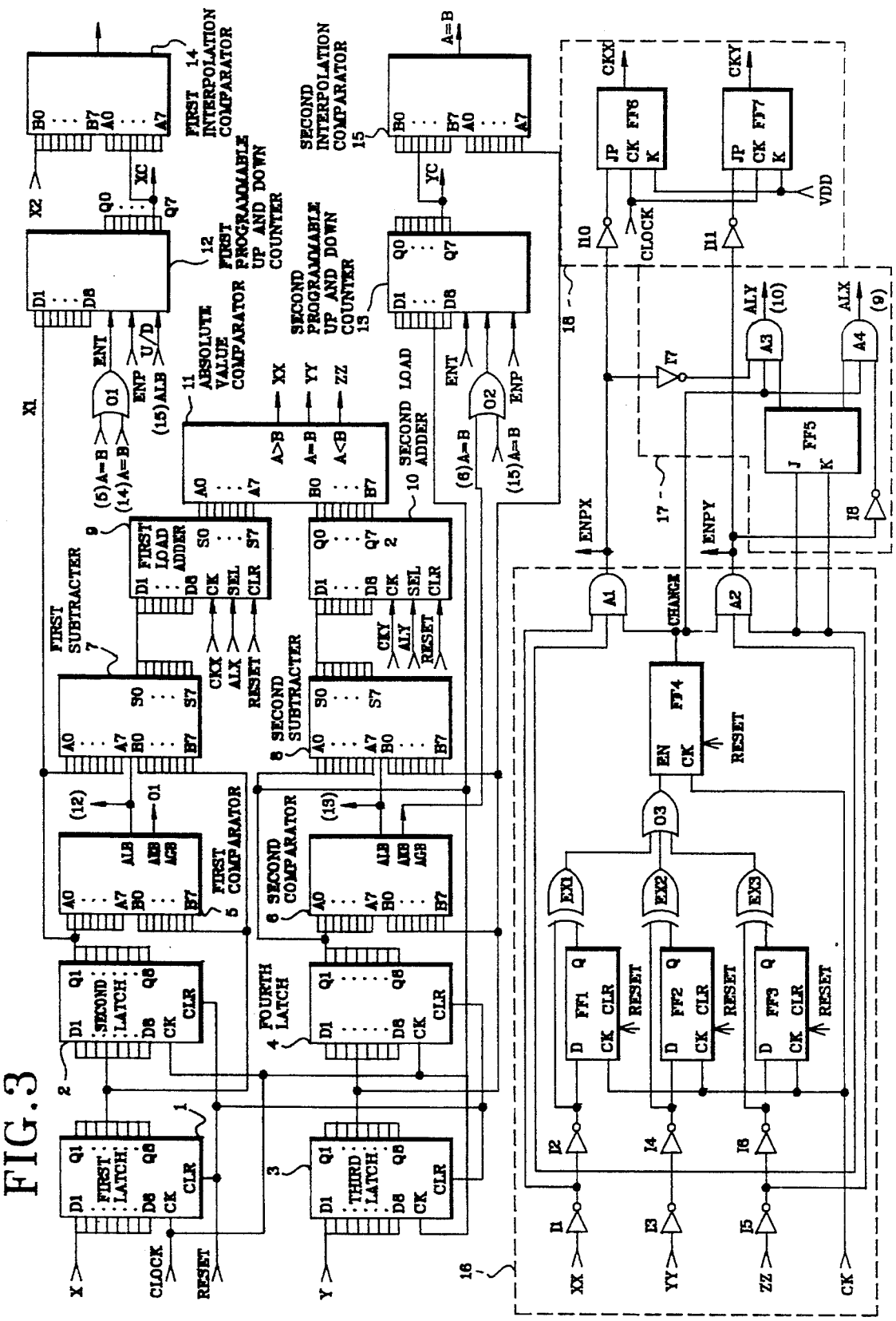
FIG. 3 is a circuit diagram illustrating an embodiment of an image interpolation circuit according to the present invention.

FIG. 3 is a block diagram of an image interpolation circuit according to an embodiment of the present invention.

In the image interpolation circuit according to FIG. 3, after a first X abscissa value X1 input by an outside input unit has been passed, a first latch 1 with eight D flip-flop (not shown) for temporarily storing the second X abscissa value X2 of 8 Bit is connected to a second latch 2 with eight D flip-flop for temporarily storing the first X abscissa value X1 of 8 Bit passing through the first latch 1.

Then, after a first Y ordinate value Y1 input simultaneously with the first X abscissa value X1 temporarily stored in the second latch 2 has been passed, a third latch 3 for temporarily storing the Y ordinate value input simultaneously with the second X abscissa value X2 is connected to a fourth latch 4 for temporarily storing the first Y ordinate value Y1 passing through the third latch 3.

The first and second latches 1 and 2 are connected to a comparator 5 for comparing the size of two X abscissa values X2, X1 by being input the first and second X abscissa values X2, X1 which are stored in the latches 1 and 2, into two input terminals B0-B7, A0-A7, simultaneously.

The third and fourth latches 3 and 4 are connected to a comparator 6 for comparing sizes of two Y ordinate values Y2, Y1 by being input with the first and second Y ordinate values Y2, Y1 which are stored in the lathes 3 and 4 into two input terminals B0-B7, A0-A7, simultaneously.

A subtracter 7 is connected to the comparator 5 and obtains an absolute value $\Delta X$ of the distance between two X abscissa values X2 and X1 being input in the two input terminals B0-B7, A0-A7 of the comparator 5 and being input by an absolute value comparison signal from the output terminal ALB of the comparator 5; and a second subtracter 8 is connected to the second comparator 6 and obtains an absolute value $\Delta Y$ of the distance between two Y ordinate values Y2, Y1 being input in the two input terminals B0-B7, A0-A7 of the comparator 6 and being input by an absolute value comparison signal from the output terminal ALB of the comparator 6.

A load adder 9 outputs a loaded value from subtracter 7 and its own absolute value $\Delta X$ by reading it, as necessary. A load adder 10 outputs a loaded value from the subtracter 8 and its own absolute value $\Delta Y$ by reading it, as necessary. The load adders 9, 10 are respectively connected to the subtracters 7, 8.

The load adders 9, 10 are also connected to an absolute value comparator 11 for outputting a value representing that A is larger, the same or less then B into the outputs XX, YY, ZZ, respectively, by comparing absolute values $\Delta X$, $\Delta Y$ from the two load adders 9, 10 with their total value.

The second latch 2 and the comparator 5 are connected to a programmable up and down counter 12 for selecting and outputting the first X abscissa value X1 stored in the second latch 2 as an interpolated X abscissa value XC according to the comparison result of the comparator 5 or as an interpolated X abscissa value XC by counting up or down according to the comparison result of the absolute value comparator 11.

The fourth latch 4 and the comparator 6 are connected to a programmable up and down counter 13 for selecting and outputting the first Y ordinate value Y1 stored in the latch 4 as an interpolated Y ordinate value YC according to the comparison result of the comparator 6 or selecting as an interpolated Y ordinate value YC by counting up or down according to the comparison result of the absolute value comparator 11.

The first latch 1 and the programmable up and down counter 12 are connected to an interpolation comparator 14 for outputting a disable signal ENT as high (hereinafter, referred to as "H") by means of the programmable up and down counter 12 only if a X abscissa value XC interpolated by the programmable up and down counter 12 is the same as the second X abscissa value X2 stored in the first latch 1 based on their comparison.

The third latch 3 and the programmable up and down counter 13 are connected to an interpolation comparator 15 for outputting a disable signal ENT as H by means of the programmable up and down counter 13 only if a Y ordinate value YC interpolated by the programmable up and down counter 13 is the same as the second Y ordinate value $\Delta 2$ stored in the third latch 3 based on their comparison.

The absolute value comparator 11 is connected to a control signal generating portion 16 for outputting count enable signals ENPX, ENPY which up or down the programmable up and down counters 12, 13 at a coordinate having a larger absolute value by assembling outputs XX, YY, ZZ of the absolute value comparator 11.

The control signal generating portion 16 is connected to a selection signal generating portion 17 for outputting the load adding signals ALX, ALY, as the load adders 9, 10 so that a sequential total value can be output in a load adder outputting a small absolute value by assembling count enable signals ENPX, ENPY and a change signal of the control signal generating portion 16. The control signal generating portion 16 is connected to the selection signal generating portion 17 for outputting the load adding signals ALX, ALY to the load adders 9, 10 so that a sequential total value is output in a load adder for outputting a small absolute value by assembling count enable signals ENPX, ENPY with the change signal of the control signal generating portion 16.

The control signal generating portion 16 is connected to a clock generator 18 for outputting a clock for controlling an operation time of the load adders 9, 10 according to count enable signals ENPX, ENPY from the control signal generating portion 16 and a clock from outside.

Meanwhile, the control signal generating portion 16 comprises inverters I1–I6 for inverting and then again inverting outputs XX, YY, ZZ of the absolute value comparator 11; D flip-flop FF1–FF3 connected to the inverters I2, I4, I6; an exclusive OR-gate EX1 for exclusively ORing outputs of the inverter I2 and D flip-flop FF1, an exclusive OR gate EX2 for exclusively ORing output of the inverter I4 and the output of D flip-flop FF2, an exclusive OR gate EX3 for exclusively ORing output of the inverter I6 and the output of D flip-flop FF3; OR gate O3 for logically summing outputs of the exclusive OR gates EX1–EX3; T flip-flop FF4 connected to the OR gate O3, for outputting a change signal; AND gate A1 for outputting a count enable signal ENPX by the programmable up and down counter 12 logical-summing outputs of the inverters 11, 13 and T flip-flop FF4; and AND gate A2 for outputting a count enable signal ENPY by the programmable up and down counter 13 for logical-summing outputs of the inverter I3, I5 and T flip-flop FF4.

The selection signal generating portion 17 comprises JK flip-flop FF5 in which two input terminals J, K are connected to the inverters I3, I5, an inverter I7 for inverting the output of the AND gate A1; an inverter I8 for inverting the output of the AND gate A2; AND gate A3 for outputting a load adding signal ALY by the load adder 10 logical-summing outputs of the T flip-flop FF4 and the inverter I7 and JK flip-flop FF5; and AND gate A4 for outputting a load adding signal ALX to the load adder 9 by logical-summing outputs of the T flip-flop FF4 and the inverter I8 and JK flip-flop FF5.

Also, the clock generator 18 comprises an inverter I10, for inverting the output of the AND gate A1, wherein two input terminals J, K are connected to the inverter I10 and a voltage source VDD, JK flip-flop FF6 for generating clock CKX to control accurately the time to execute a load or adding of the load adder 9, an inverter I11 for inverting the output of the AND gate A2, and JK flip-flop FF7 for generating a clock CKY to control accurately the time to execute a load or adding of the load adder 10, whose two input terminals J, K are connected to the inverter I11 and the voltage source VDD.

Figure 4:
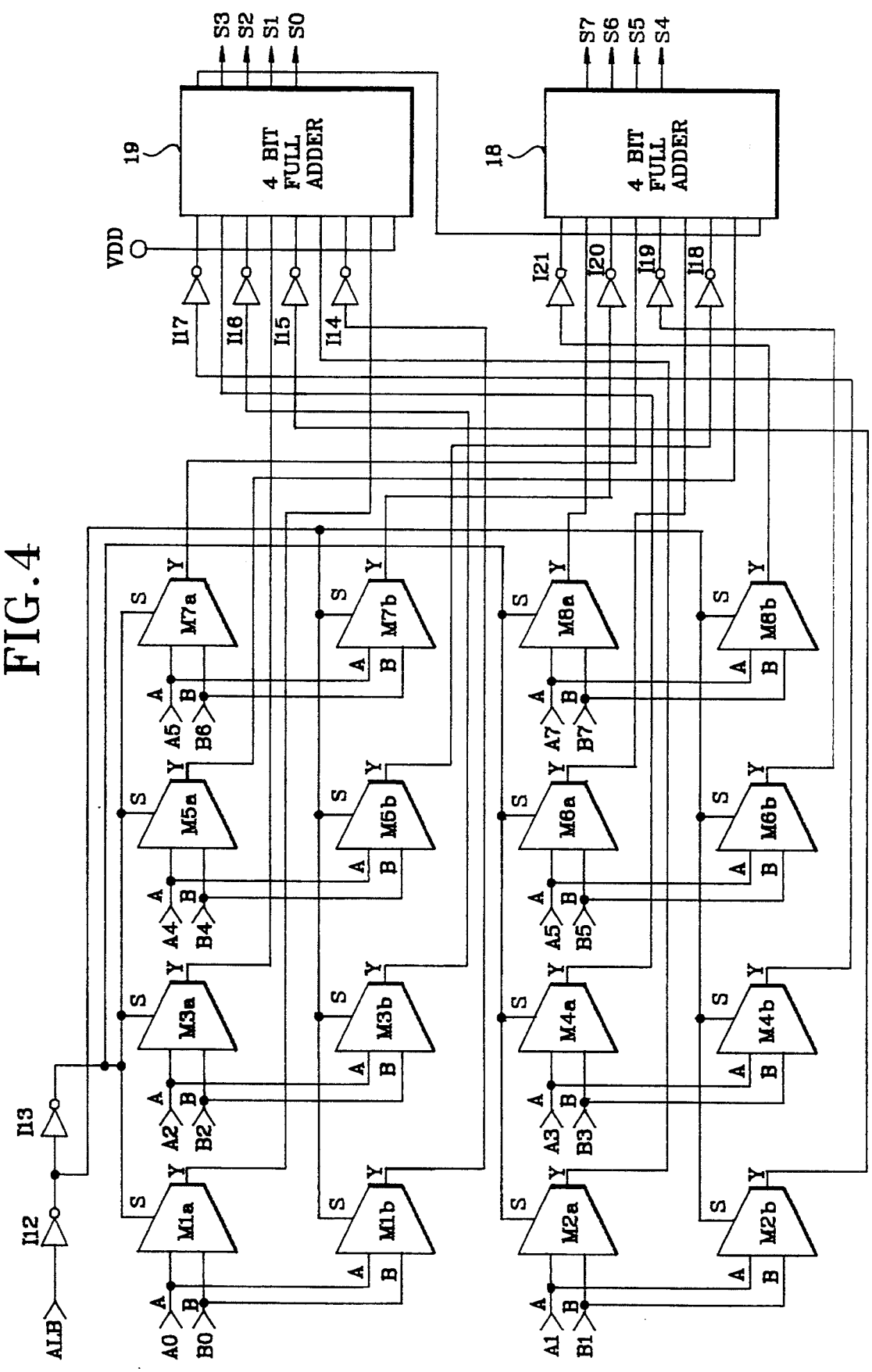
FIG. 4 is a detailed block diagram illustrating a subtracter of FIG. 3.

FIG. 4 is a detailed block diagram illustrating subtracter 7, 8 of FIG. 3.

The subtracters 7, 8 are constructed to obtain an absolute value corresponding to the distance between two abscissa and ordinate values X1, X2 and Y1, Y2, after passing directly or through inverters I14–I21 and two 4 Bit full adders 19, 20 from the output terminal Y, by applying a comparison signal from the output terminal ALB of the comparators 5, 6, which are inverted through an inverter I12 or re-inverted through the inverter I13, to the selection terminal S of eight pairs of multiplexers M1a–M8a and M1b–M8b and by inputting the second abscissa or ordinate value X2 or Y2 from the latches 3, 4 and the first abscissa or ordinate value X1 or Y1 into input terminals A, B.

Figure 5:
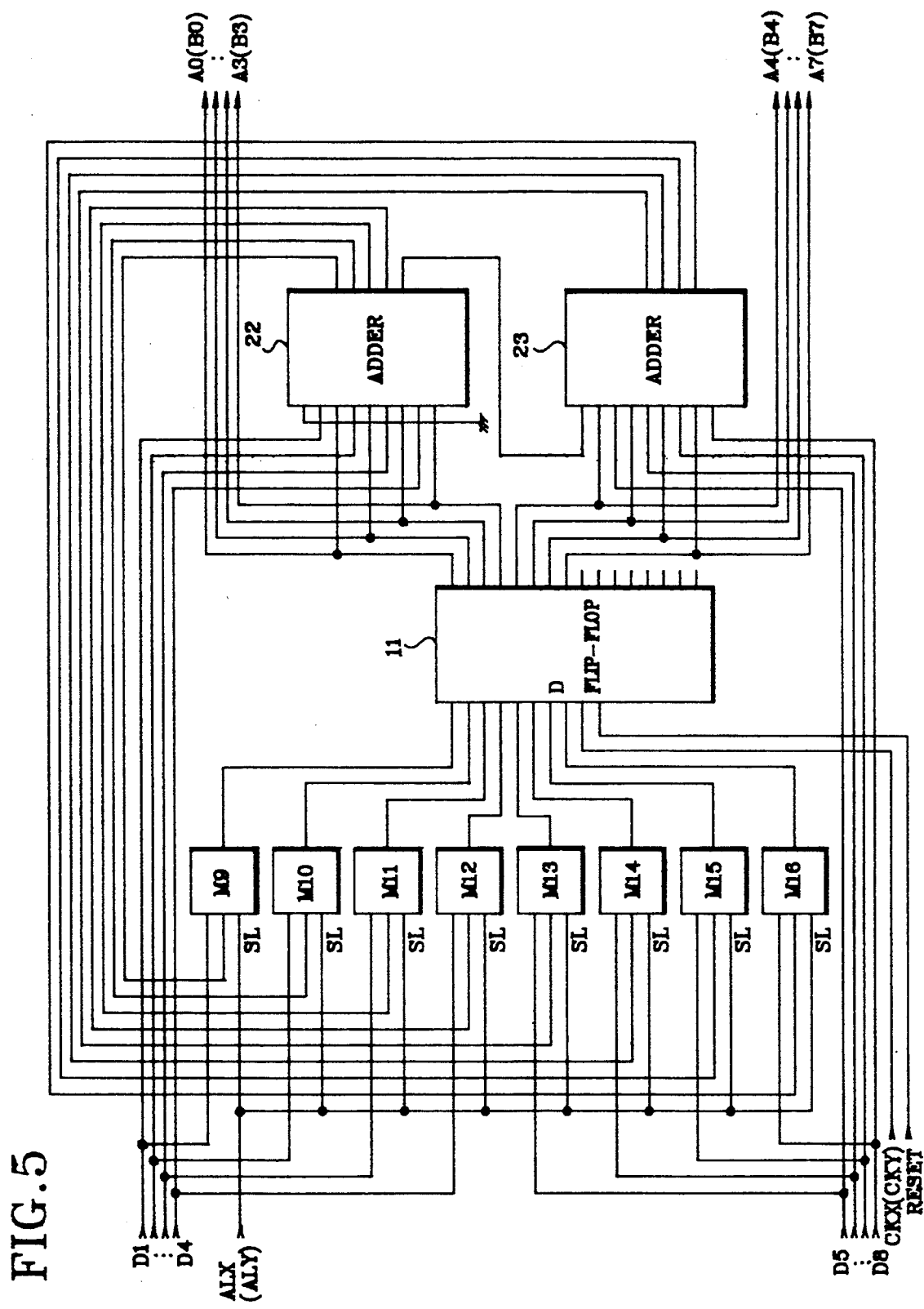
FIG. 5 is a detailed block diagram illustrating a load adder of FIG. 3.

FIG. 5 is a detailed block diagram illustrating load adders 9, 10 according to FIG. 3.

The load adders 9, 10 comprise a plurality of multiplexers M9–M16 for multiplexing outputs of the first and second subtracters 7, 8, D flip-flop 21 connected to the multiplexers M9–M16, for temporarily storing outputs of multiplexers M9–M16, and adders 22, 23 connected to the multiplexers M9–M16 and D flip-flop 21, for adding outputs of the subtracters 7, 8 and D flip-flop 21.

Figure 6:
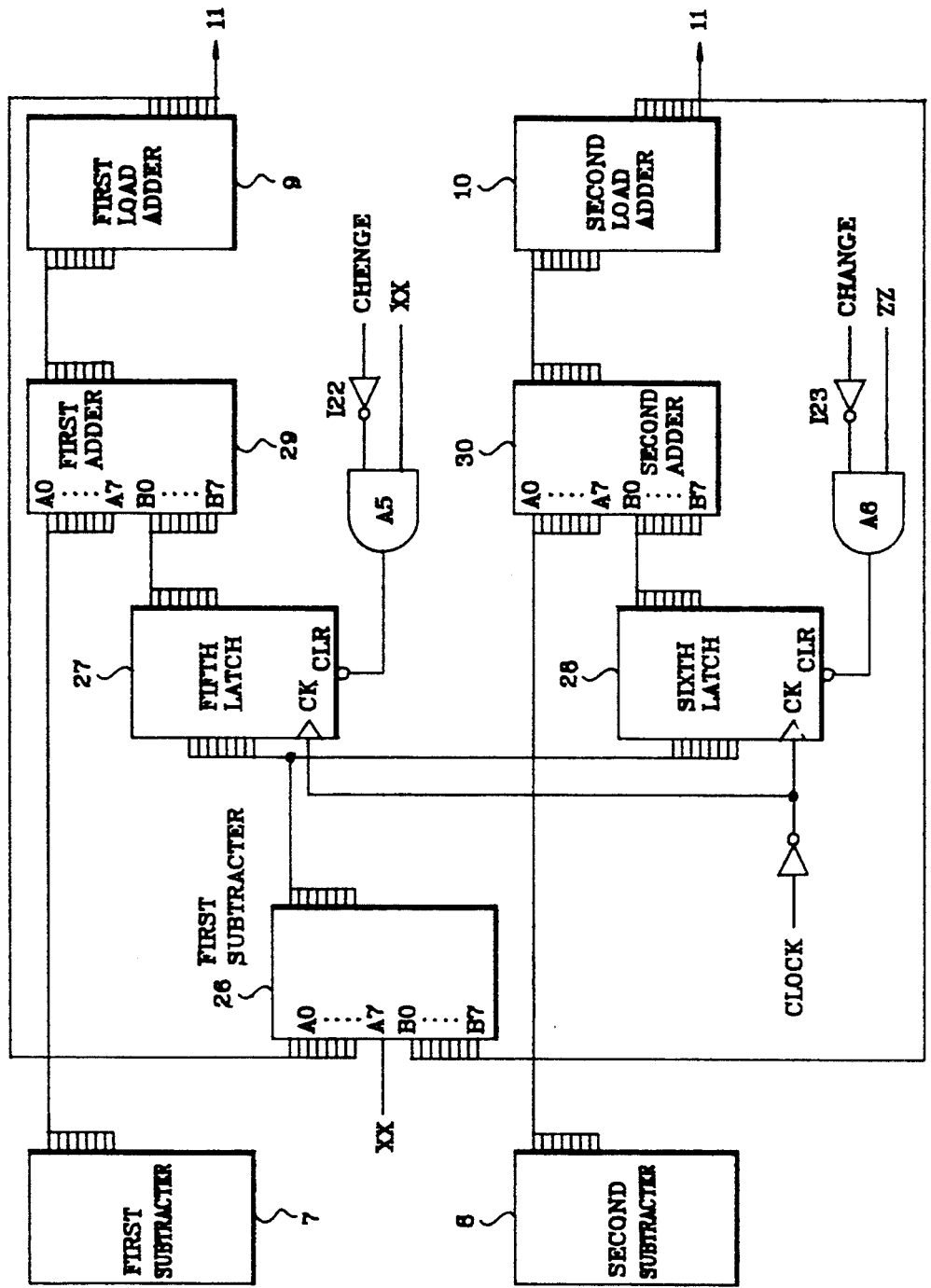
FIG. 6 is a detailed block diagram between the subtracter and the load adder of FIG. 3.

FIG. 6 is a detailed block diagram showing intervals between the subtracters 7, 8 and the load adders 9, 10, and comprises a subtracter 26 wherein output of load adders 9, 10 and output XX of an absolute value comparator 11 are input; latches 27, 28 for temporarily storing the output of the subtracter 26; an adder 29 for adding the output of the subtracter 7 and the latch 27; and an adder 3 for adding the output of the subtracter 8 and the latch 28.

Figures 7A, 7B:
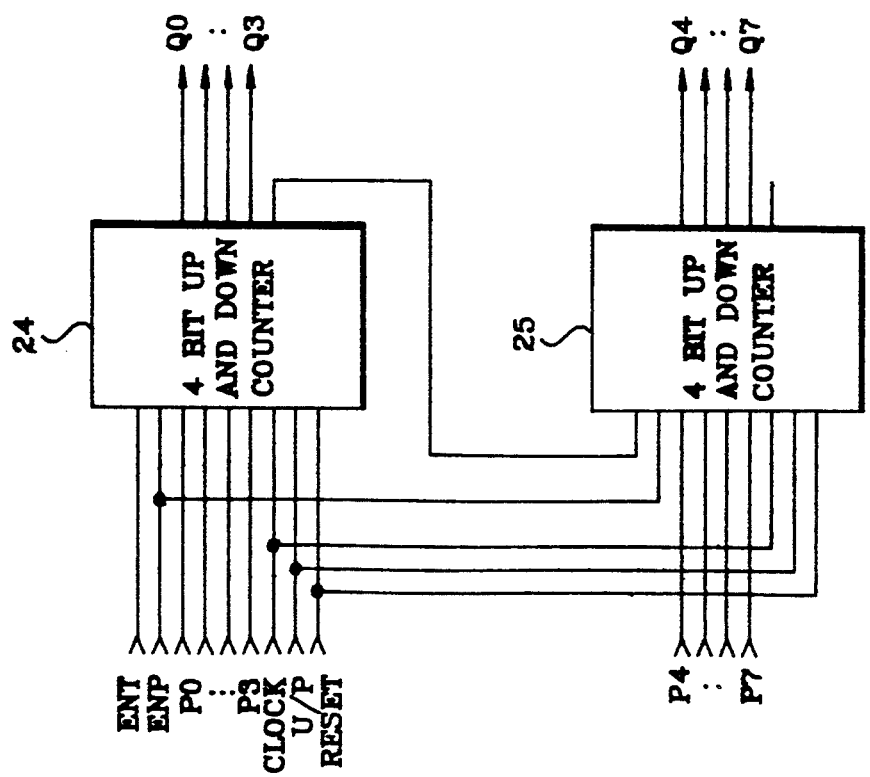
FIG. 7A and 7B are detailed block diagrams illustrating a programmable up and down counter of FIG. 3 and a logical diagram illustrating an operation of the programmable up and down counter, respectively.

FIG. 7A is a detailed block diagram illustrating programmable up and down counters 12, 13 and FIG. 7B is a logic diagram.

The programmable up and down counters 12, 13 comprise 4 Bit up and down counters 24, 25; and in each of these 4 Bit up and down counters 24, 25, a disable signal ENT, count enable signals ENPX, ENPY, a clock, and up and down U/D signal and a reset signal by a comparison signal ALB from the comparators 5, 6 are input; as shown in logic diagram of FIG. 7B, if a clock increases, a disable signal ENT from the comparators 5, 6 and interpolation comparators 14, 15 are input as low, and the count enable signals ENPX, ENPY from a control signal generating portion 16 are input as low (hereinafter, referred to as "L"), and if an up and down signal (U/D) is low, down count is executed, and if an up and down signal (U/D) is high, up count is executed, an 8 Bit data corresponding to the coordinate value interpolated up and down into output terminals Q1–Q7 is output.

Figure 9:
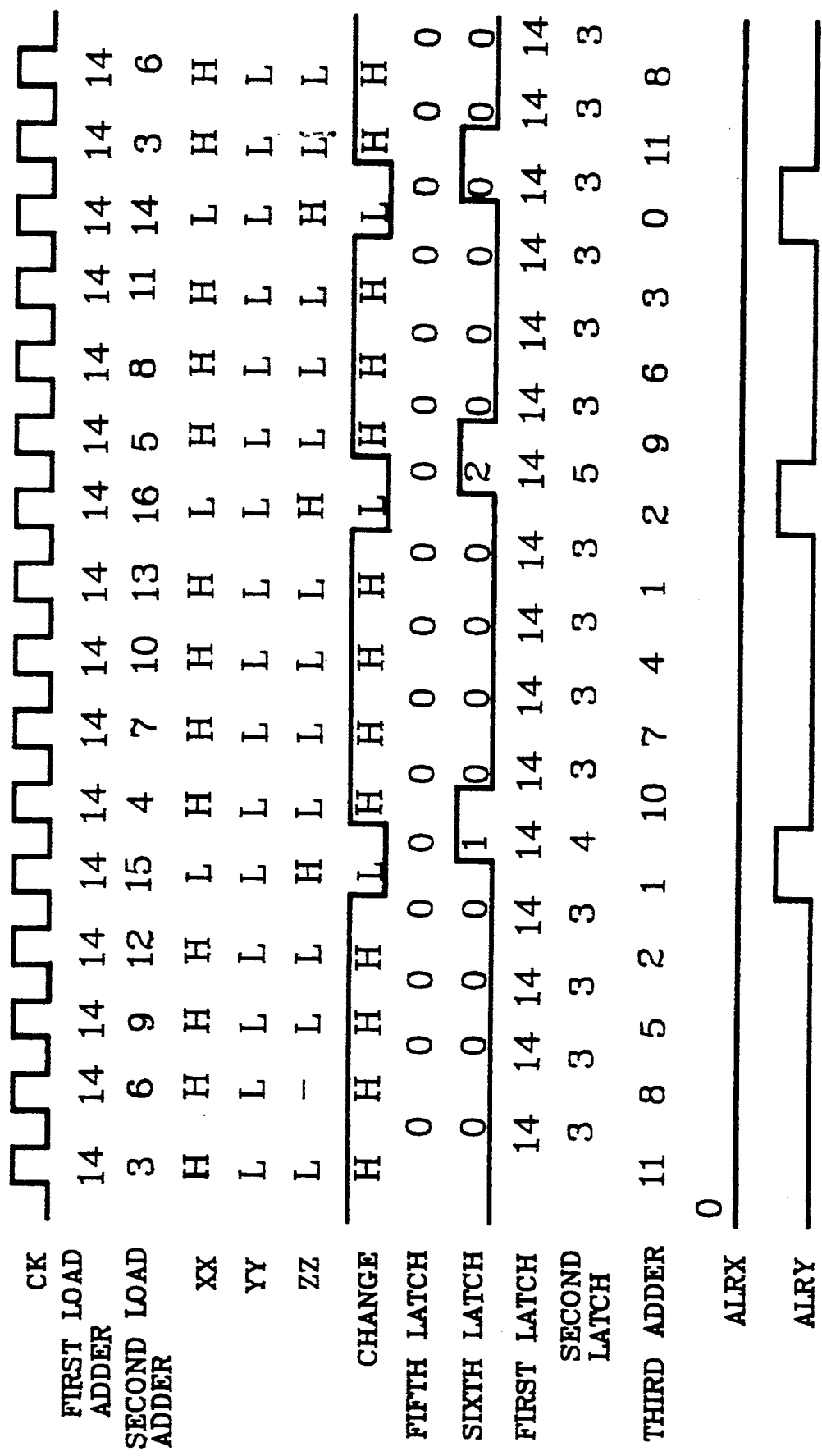
FIG. 9 is a diagram illustrating an operation in which an absolute value summed by the load adder is input.
Figures 10A, 10B:
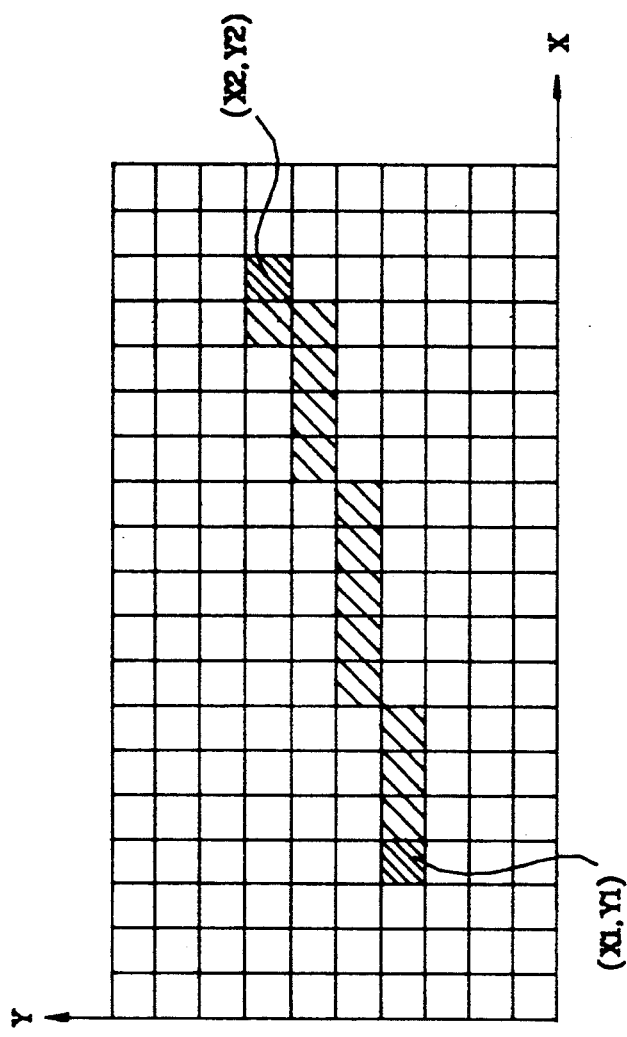
FIGS. 10A and 10B are respectively a graph and a diagram illustrating a status of following-up an interpolation between two coordinate points according to the present invention.

FIG. 8 is a diagram illustrating an operation of the control signal generating portion of FIG. 3, and FIG. 9 is a diagram showing an input operation input by an absolute value totaled by a load adder, and FIGS. 10A and 10B respectively are a graph and a diagram showing the status of the following up an interpolation between two coordinate points.

According to the present invention constructed as above, if two coordinate points X1, Y1 and X2, Y2 are input in turn from an external input unit, the first X abscissa value X1 in the latch 2, the first Y ordinate value Y1 in the latch 4, the second X abscissa value X2 in the latch 1, and the second Y ordinate value in the latch 3 are stored temporarily as 8 Bit data, respectively.

A comparator 5 compares the sizes between two X abscissa values X1, X2 from the latches 1, 2, and a comparator 6 compares the sizes between two Y ordinate values Y1, Y2 from the latches 3, 4. As a result of such comparisons, if all abscissa and ordinate values are the same, or if either abscissa or ordinate values are the same, an interpolation is not needed or there is no need to get a separate interpolation since there are parallel straight lines in the coordinates.

Therefore, in the case where two X abscissa values X1, X2 and two Y ordinate values Y1, Y2 are all different, absolute values $\Delta X$, $\Delta Y$ of distances of each of the two X abscissa values X1, X2 and the two Y ordinate values Y1, Y2 are obtained in the subtracters 7, 8.

The absolute value comparator 11 is input through the load adders 9, 10 for temporarily storing the absolute values $\Delta X$, $\Delta Y$, comparing the sizes of the two absolute values $\Delta X$, $\Delta Y$ to each other, and if the X-axis absolute value is larger, then only output XX is output as H; if two absolute values are the same, then only output YY is output as H; and the if X-axis absolute value is smaller, then only output ZZ is output as H.

That is, if the X-axis absolute value $\Delta X$ is larger, then outputs XX, YY, ZZ are output as H, L, L, and the control signal generating portion 16 being input with the value, outputs the count enable signals ENPX, ENPY as L, H, and change signal is also H, so that the output ZZ passes through the inverter I9 or directly passes through JK flip-flop FF5, and the load adding signals ALY, ALX as outputs of AND gates A3, A4 are output as H, L, respectively.

Accordingly, the programmable up and down counter 12 for applying the count enable signal ENPX as "L" is count-enabled and it executes up and down of the X abscissa, whereas the programmable up and down counter 13 for applying the count enable signal ENPY as "H" is count disabled, so that the interpolated value at this time is output to only the X abscissa as a value up or down of 1.

Since the load adding signals ALX, ALY are input as L, H, respectively, in the load adders 9, 10, the input terminal is selected in the multiplexers M9–M16 for FIG. 5; and therefore the output of the load adder output to the absolute value comparator 11 is the X axis absolute value $\Delta X$; and in the load adder 10, the total value $2\Delta Y$ of the absolute value $\Delta Y$ first input by adders 22, 23 and the absolute value $\Delta Y$ reading again is output, thereby comparing them in the absolute comparator 11.

According to outputs XX, YY, ZZ by the comparison result of the absolute value comparator 11, i.e., according to whether the result of comparing $\Delta X$ with $2\Delta Y$ is $\Delta X > 2\Delta Y$, $\Delta X = 2\Delta Y$, or $\Delta X < 2\Delta Y$, the count enable signals ENPX, ENPY of the programmable up and down counters 12, 13 are to have a value of "H" or "L". And the load adding signals ALY, ALX, have a "H" or "L" value, otherwise, comparing the total $3\Delta Y$ and $\Delta X$ values, after outputting the load adding signals ALY, ALX as an interpolated output by up or down counting as a value of 1 in the programmable up and down counters 12, 13, abscissa and ordinate values XC, YC interpolated in the interpolation comparators 14, 15 and the second abscissa and ordinate values X2, Y2 stored in the latches 1, 3 are compared to each other. If they are not the same, then an interpolation follows up continually.

In this connection, as a result of obtaining the absolute values $\Delta X$, $\Delta Y$ of the distances regarding two X abscissa values X1, X2 and two Y ordinate values Y1, Y2 in the subtracters 7, 8, if the absolute values are X=14 and Y=3, outputs XX, YY, ZZ of the absolute value comparator 11 being input through the load adders 9, 10 become H, L, L, respectively. According to this, the control signal generating portion 16 outputs the count enable signals ENPX, ENPY as L, H, respectively, and since the change signal is also "H", the load adding signals ALX, ALY of the selection signal generating portion 17 are output as "L" "H" respectively.

Therefore, since the count enable signal ENPX is "L", the programmable up and down counter 12 makes the first X abscissa value X1 count up or down by 1.

In this regard, suppose that the second coordinate values X2, Y2 are larger that the first coordinate values X1, Y1, values X1+1, Y1 added by 1 only in the X abscissa as shown in FIG. 7A are output to the first interpolated abscissa and ordinate values XC, YC and, at the same time, these values are compared with the second coordinate values X2, Y2, respectively, in the interpolation comparators 14, 15. Meantime, since the load adding signal ALY is "L" the load adder 9 outputs the absolute value $\Delta X = 14$ from the subtracter 7 as it is and the load adder 10 outputs the total value $\Delta Y + \Delta Y = 6$ of two the absolute values.

Accordingly, when outputs XX, YY, ZZ of the absolute value comparator 11 are H, L, L, respectively, the absolute values interpolated by the same process as above are XC=X1+1+1, YC=Y1, and the load adders 9, 10 output the absolute value $\Delta X = 14$ and the total value $\Delta Y + \Delta Y + \Delta Y = 3$.

If the output $\Delta Y + \Delta Y + \Delta Y + \Delta Y + \Delta Y = 15$ of the load adder 10 is larger than the absolute value $\Delta X = 14$, outputs XX, YY, ZZ of the absolute value comparator 11 are L, L, H, respectively, and since the change signal is L as shown in FIG. 8, the enable signals ENTX, ENTY from the AND gates A1, A2 are output as "L", the programmable up and down counters 12, 13 are simultaneously enabled, and are counted by 1, at the same time the load adding signals ALY, ALX are output as "H", so that values output from the load adders 9, 10 become the absolute values $\Delta X$, $\Delta Y$ input to an axis input terminal of the multiplexers M9–M16.

At this time, if an absolute value of X axis $\Delta X$ is the same as a total vale $n\Delta Y$ of an absolute value of the Y axis, the count enable processing is repeated, however, if the total value $n\Delta Y$ of the Y axis absolute value is larger than the X axis absolute value, i.e., $X < n\Delta Y$, then an absolute value $n\Delta Y - \Delta X$ obtained from the subtracter 26 is temporarily stored in latches 27, 28, wherein outputs XX, ZZ of the absolute value comparator 11 are "L", "H", respectively, as shown in FIG. 9, and since the change signal is "L" the latch 27 is clear, and since the absolute value $n\Delta Y - \Delta X$ passing through the latch 28 is added in the adder 30 and is input into the load adder 10, the process of comparison in the absolute value comparator 11 together with the output of the load adder 9 being input with the X axis absolute value from the adder 29 is repeated.

The comparison is carried out $\Delta X$ and $n\Delta Y - \Delta X + \Delta Y$, $\Delta X$ and $n\Delta Y - \Delta X + 2\Delta Y$ ... $\Delta X$ and $n\Delta Y - \Delta X + m\Delta Y$, sequentially. In the same way, if the final compared values are the same, it is next restored to the absolute values $\Delta X$, $\Delta Y$ of the initial stage, however, if the total value $n\Delta Y - \Delta X + m\Delta Y$ of the Y axis absolute value is larger, then the process is repeated by making the value of adding again the Y axis absolute value to $n\Delta Y - \Delta X + m\Delta Y - \Delta X$ as the initial value. These processes are continuously executed until outputs XC, YC which are interpolated and continuously output in the the programmable up and down counters 12, 13 get to be the same as the second coordinate values X2, Y2 which are input in the interpolation comparators 14, 15.

As indicated above, when using an input unit in which the transmission speed is slow, the discontinued space between two coordinate points is linearly connected, wherein after comparing two coordinate points in the case where they are different, by comparing absolute values of two coordinate values X, Y, and counting up or down the interpolation outputs of larger absolute values by means of the programmable up and down counters 12, 13, and repeating the process until totaled values adding smaller absolute values are the same as or larger than larger absolute values, respectively, and again executing the process by establishing the values of the beginning, so that if the third coordinate values X3, Y3 are input, the processes are repeated by execution based on the second coordinate values X2, Y2, thereby linearly connecting the discontinued space between two coordinate points.

According to the image interpolation circuit of the present invention, an interpolation value of a straight line can be obtained by obtaining sequentially the absolute values according to the distance between two coordinate points input when using an external input unit having a slow transmission speed, the interpolation value can be also obtained by using a construction of hardware, so that a processing speed is faster than a processing speed using the conventional software and furthermore, very little portions can be disclosed. In addition, there is an effect of reducing expenditure since matching with other peripheral circuits becomes easy.

The present invention is in no way limited to the specific embodiments described hereinabove. Various modification of the disclosed embodiments of the present invention will become apparent to persons skilled in the art upon reference to the description of the present invention. Therefore, the appended claims is intended to cover any such modifications or embodiments as fall within the true scope of the present invention.

What is claimed is:

1. An image interpolation circuit comprising:
   first through fourth latches storing X abscissa and Y ordinate values of two coordinate points input by an external input unit;
   first and second comparators connected to said for comparing sizes between input X1 and X2 abscissa points and between input Y1 and Y2 ordinate points;
   first and second subtracters connected to said first and second comparators, respectively, for obtaining absolute values of the differences between input X1 and X2 abscissa points and between input Y1 and Y2 ordinate points;
   first and second load adders connected to said first and second subtracters, respectively, for adding absolute values of the X1 and X2 abscissa points and of said Y1 and Y2 ordinate points to the loaded values, after loading absolute values of said X1 and X2 abscissa points and of said Y1 and Y2 ordinate points obtained from said first and second subtracters;
   an absolute value comparator connected to said first and second load adders, for comparing outputs of said first and second load adders;
   first and second programmable up and down counters connected to said second and fourth latches and said first and second comparators, respectively, for outputting an interpolation signal by up or down counting said first X axis abscissa value or said Y axis ordinate value having a larger absolute value as a result of the comparison of said absolute value comparator;
   first and second interpolation comparators connected to said first and second programmable up and down counters, for disabling said first and second programmable up and down counters by comparing outputs of said first and second programmable up and down counters with the second X axis input value and Y axis input value;
   control signal generating means connected to said absolute value comparator, for outputting count enable signals of said first and second programmable up and down counters by using the output of said absolute value comparator;
   selection signal generating means connected to said control signal generating means, for controlling loads for adding said first and second load adders by using an output signal of said control signal generating means; and
   a clock generator connected to said control signal generating means, for generating a clock to control an operation of said first and second load adders by assembling an output signal of said control signal generating means with an outside clock signal.

2. The image interpolation circuit according to claim 1, wherein said first and second subtracters comprise:
   inverter means for inverting and re-inverting outputs from said first and second comparators;
   a plurality of multiplexers, each having a selection terminal connected to said inverter means, for multiplexing coordinate values input into the input terminals;
   a plurality of inverters connected to said plurality of multiplexers, for inverting outputs of said multiplexers; and
   a plurality of 4 Bit full adders connected to said plurality of inverters.

3. The image interpolation circuit according to claim 1, wherein said first and second load adders comprise:
   a plurality of multiplexers for multiplexing outputs of said first and second subtracters;
   a D flip-flop connected to said plurality of multiplexers, for temporarily storing outputs of said plurality of multiplexers; and
   an adder connected to said plurality of multiplexers and D flip-flop, for adding outputs of said first and second subtracters and D flip-flop.

4. An image interpolation circuit comprising:
   a plurality of latches for storing X abscissa and Y ordinate values of two coordinate points input by an external input unit;
   a plurality of comparators connected to said plurality of latches for comparing sizes between input X1 and X2 abscissa points and between input Y1 and Y2 ordinate points;
   a plurality of subtracters connected to said comparators for obtaining absolute values of the differences between input X1 and X2 abscissa points and between input Y1 and Y2 ordinate points;
   a plurality of load adders connected to said subtracters for adding absolute values of the X1 and X2 abscissa points and of said Y1 and Y2 ordinate points to the loaded values, after loading absolute values of said X1 and X2 abscissa points and of said Y1 and Y2 ordinate points obtained from said first and second subtracters;
   an absolute value comparator connected to said load adders, for comparing outputs of said load adders;

a plurality of programmable up and down counters connected to said latches and said comparators for outputting an interpolation signal by up or down counting said first X axis abscissa value or said Y axis ordinate value having a larger absolute value as a result of the comparison of said absolute value comparator;

a plurality of interpolation comparators connected to said programmable up and down counters, for disabling said programmable up and down counters by comparing outputs of said programmable up and down counters with the second X axis input value and Y axis input value;

control signal generating means connected to said absolute value comparator, for outputting count enable signals of said programmable up and down counters by using the output of said absolute value comparator;

selection signal generating means connected to said control signal generating means, for controlling loads or for adding said load adders by using an output signal of said control signal generating means; and a clock generator connected to said control signal generating means, for generating a clock to control an operation of said load adders by assembling an output signal of said control signal generating means with an external clock signal.

* * * * *